(12) United States Patent
Kondo et al.

(10) Patent No.: US 12,244,149 B2
(45) Date of Patent: Mar. 4, 2025

(54) ENERGY SUPPLY SYSTEM

(71) Applicant: Kawasaki Jukogyo Kabushiki Kaisha, Kobe (JP)

(72) Inventors: Koki Kondo, Kobe (JP); Keiji Sakagawa, Kobe (JP); Kazuhide Hakamada, Kobe (JP); Akira Hanamitsu, Kobe (JP); Kazuhiko Tanimura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 216 days.

(21) Appl. No.: 17/916,039

(22) PCT Filed: Mar. 17, 2021

(86) PCT No.: PCT/JP2021/010893
§ 371 (c)(1),
(2) Date: Sep. 30, 2022

(87) PCT Pub. No.: WO2021/200170
PCT Pub. Date: Oct. 7, 2021

(65) Prior Publication Data
US 2023/0170702 A1    Jun. 1, 2023

(30) Foreign Application Priority Data

Apr. 1, 2020 (JP) ................. 2020-066217

(51) Int. Cl.
*H02J 3/32* (2006.01)
*B60L 3/00* (2019.01)
(Continued)

(52) U.S. Cl.
CPC ............ *H02J 3/322* (2020.01); *B60L 3/0023* (2013.01); *B60L 50/00* (2019.02); *B64C 39/024* (2013.01);
(Continued)

(58) Field of Classification Search
CPC .. H02J 3/322; H02J 3/003; H02J 3/004; H02J 3/381; B60L 50/00; B60L 3/0023; G05D 1/101
(Continued)

(56) References Cited

U.S. PATENT DOCUMENTS 9,961,572 B2 * 5/2018 Foster ................. H04W 24/04
11,236,864 B1 * 2/2022 Ewan ...................... F17D 1/02
(Continued)

FOREIGN PATENT DOCUMENTS

JP        4719709 B2    7/2011

*Primary Examiner* — Yazan A Soofi
(74) *Attorney, Agent, or Firm* — XSENSUS LLP

(57) ABSTRACT

An energy supply system, which is a system constituting a regional power system in a target region, includes a power transmission system including a first power generation facility and a second power generation facility, a power transmission and distribution system that supplies power to each consumer, a management system, and an unmanned flying object. The unmanned flying object has a transport function of transporting a cargo and a power supply function of supplying power to an outside. When the amount of power supplied by the power transmission system is less than the amount of power required by the power transmission and distribution system, the management system performs a power adjustment process of supplying power from the unmanned flying object to the power transmission and distribution system by using the power supply function of the unmanned flying object.

16 Claims, 15 Drawing Sheets

(51) Int. Cl.
  *B60L 50/00* (2019.01)
  *B64C 39/02* (2023.01)
  *B64D 9/00* (2006.01)
  *B64U 10/13* (2023.01)
  *B64U 20/87* (2023.01)
  *B64U 50/19* (2023.01)
  *B64U 50/30* (2023.01)
  *B64U 50/33* (2023.01)
  *B64U 101/10* (2023.01)
  *B64U 101/30* (2023.01)
  *B64U 101/60* (2023.01)
  *G05D 1/00* (2024.01)
  *H02J 3/00* (2006.01)
  *H02J 3/38* (2006.01)

(52) U.S. Cl.
  CPC ............... *B64D 9/00* (2013.01); *B64U 20/87* (2023.01); *B64U 50/30* (2023.01); *G05D 1/101* (2013.01); *H02J 3/003* (2020.01); *H02J 3/004* (2020.01); *H02J 3/381* (2013.01); *B64U 10/13* (2023.01); *B64U 50/19* (2023.01); *B64U 50/33* (2023.01); *B64U 2101/10* (2023.01); *B64U 2101/30* (2023.01); *B64U 2101/60* (2023.01); *B64U 2201/10* (2023.01)

(58) Field of Classification Search
  USPC .......................................................... 701/16
  See application file for complete search history.

(56) References Cited

U.S. PATENT DOCUMENTS

| | | | |
|---|---|---|---|
| 11,747,781 B1* | 9/2023 | Lemsaddek | H02J 3/381 |
| | | | 700/295 |
| 2019/0112049 A1* | 4/2019 | Phan | B64D 5/00 |
| 2019/0330033 A1* | 10/2019 | Brutoco | B66F 19/00 |
| 2020/0033851 A1* | 1/2020 | Hajimiri | G05D 1/0027 |
| 2020/0070680 A1* | 3/2020 | Whaling | B60L 55/00 |
| 2021/0113130 A1* | 4/2021 | Tran | A61B 5/1032 |
| 2021/0291803 A1* | 9/2021 | Gesang | B60W 10/08 |
| 2022/0115877 A1* | 4/2022 | Stanfield | B60L 3/04 |
| 2022/0371574 A1* | 11/2022 | Chevalier | B60W 60/0023 |

* cited by examiner

FIG.14
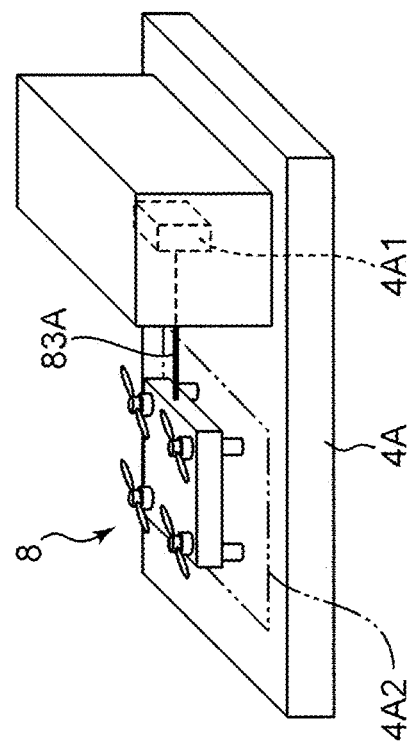
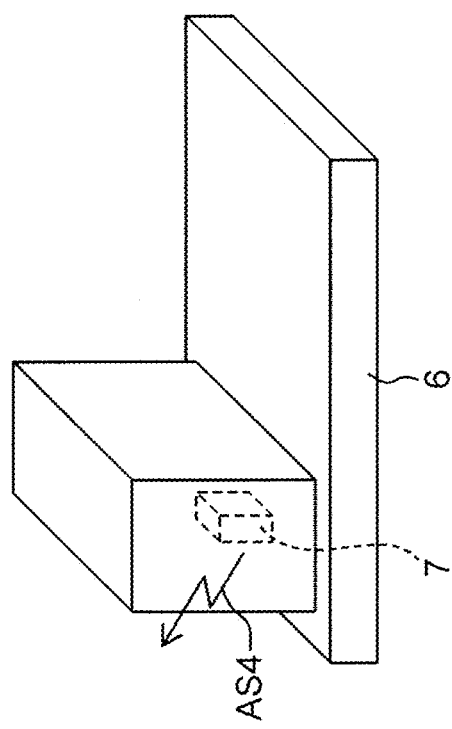

ENERGY SUPPLY SYSTEM

CROSS-REFERENCE TO RELATED APPLICATIONS

The present application is based on PCT filing PCT/JP2021/010893, filed Mar. 17, 2021, which claims priority to JP 2020-066217, filed Apr. 1, 2020, the entire contents of each are incorporated herein by reference.

TECHNICAL FIELD

The present disclosure relates to an energy supply system constituting a regional power system in a target region such as a wide-area local government.

BACKGROUND ART

In recent years, as a means for supplying power to disaster prevention bases at the time of disaster or the like, power generation facilities using renewable energy such as sunlight or wind power have been more widely interconnected with power transmission and distribution systems. However, a power generation facility using renewable energy, with its variable output, has a difficulty in supplying power stably.

For example, Patent Literature 1 discloses a disaster response power supply system in which a natural energy power source is provided at a disaster prevention base in normal times, and at the time of disaster, a local system of the disaster prevention base is separated from a power transmission and distribution system, and a load for disaster and a transportable power adjustment facility are connected to the local system.

In Patent Literature 1, a storage battery and an engine generator, which are facilities specialized for power generation, are used as power adjustment facilities, and have low facility use efficiency. Furthermore, since a generator needs a periodic inspection in order to reliably operate at the time of disaster, maintenance and management costs become large when the number of generators to be installed is large or an installation area is wide.

CITATION LIST

Patent Literature

Patent Literature 1: JP 4719709 B2

SUMMARY

The present disclosure has been made in view of such circumstances, and an object of the present disclosure is to provide an energy supply system capable of stabilizing power supply to a power transmission and distribution system and improving facility use efficiency.

An energy supply system according to one aspect of the present disclosure includes a power transmission system which is installed in a target region and includes a first power generation facility that generates power by using renewable energy and a second power generation facility that generates power by using fossil fuel, a power transmission and distribution system to which power is transmitted from the power transmission system and that supplies power to a consumer in the target region, a mover having a transport function of transporting a cargo and a power supply function of supplying power to an outside of the mover, and a management system that manages the power transmission system, the power transmission and distribution system, and the mover. The management system predicts an amount of power supplied by the power transmission system and an amount of power required by the power transmission and distribution system, and supplies power from the mover to the power transmission and distribution system by using the power supply function of the mover when the amount of power supplied is less than the amount of power required.

BRIEF DESCRIPTION OF DRAWINGS

FIG. 14 is a diagram illustrating a state in which the unmanned flying object lands on a scheduled landing site in accordance with the disaster response process, and power is supplied from the unmanned flying object to a local system of a specific consumer.

DESCRIPTION OF EMBODIMENTS

Hereinafter, an energy supply system according to an embodiment of the present disclosure will be described with reference to the drawings.

Figure 1:
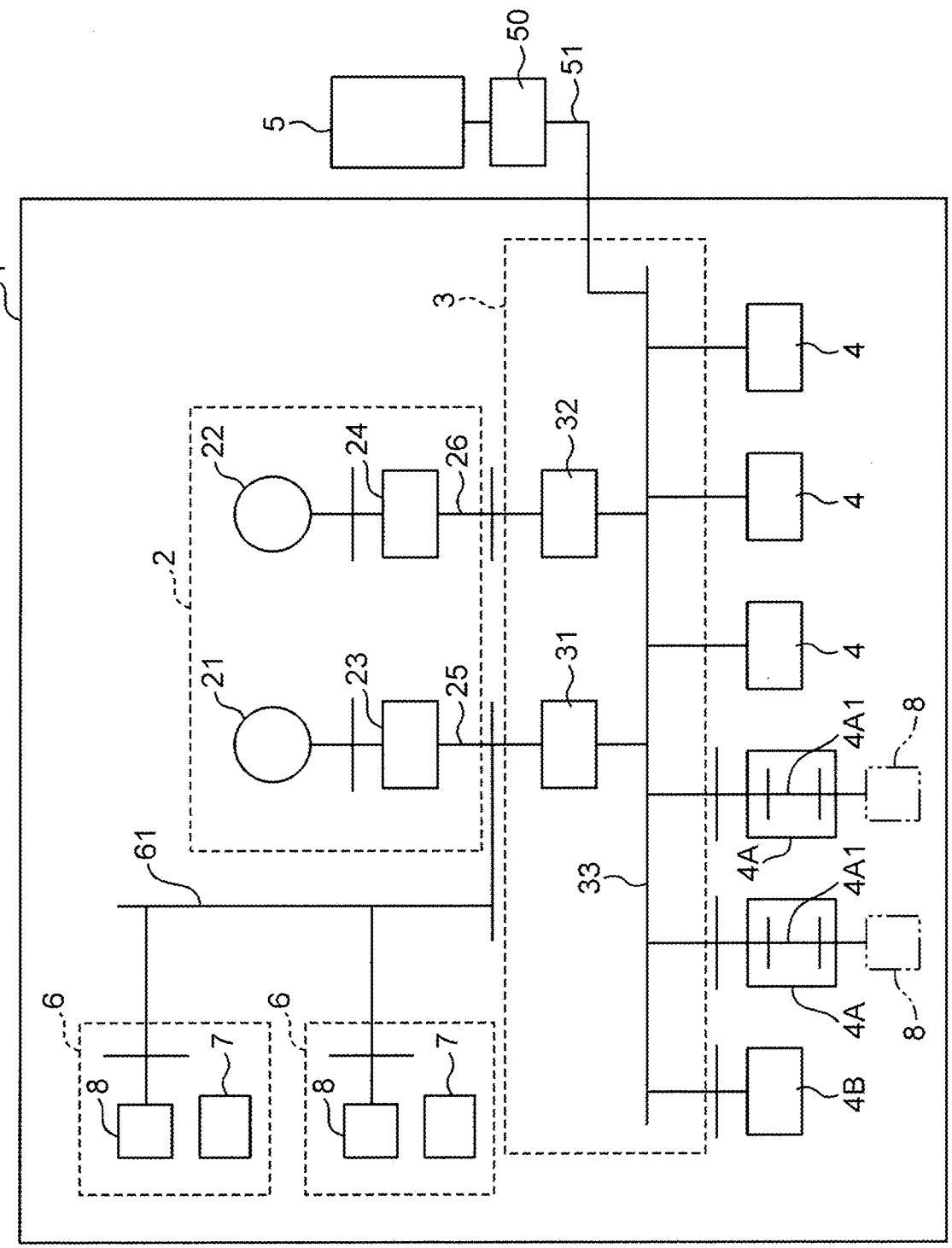
FIG. 1 is a diagram of a regional power system configured by an energy supply system according to one embodiment of the present disclosure.

FIG. 1 is a diagram illustrating a configuration an energy supply system 1 according to one embodiment of the present disclosure. The energy supply system 1 constitutes a regional power system in a target region. The target region is, for example, a wide-area local government. The wide-area local government is a local government serving a wide area in which a plurality of basic local governments such as municipalities are comprehensively organized, and is a local government to which a regional system covering a wide area including a prefecture or a plurality of prefectures is applied.

The energy supply system 1 includes a power transmission system 2, a power transmission and distribution system 3 that supplies power to each consumer 4 in a target region, an external power system 5, a management system 7 installed in a management base 6 in the target region, and an unmanned flying object 8 (unmanned aircraft) as a mobile body (mover).

The power transmission system 2 includes a first power generation facility 21, a second power generation facility 22, a first transmission-side substation facility 23, a second transmission-side substation facility 24, a first power transmission line 25, and a second power transmission line 26 installed in the target region.

The first power generation facility 21 is a power generation facility that generates power by using renewable energy such as sunlight or wind power. The second power generation facility 22 is a power generation facility that generates power by using fossil fuel. In the target region, one or more first power generation facilities 21 and one or more second power generation facilities 22 are installed. The first transmission-side substation facility 23 is a substation facility that converts a voltage and a frequency of electricity generated by the first power generation facility 21. The second transmission-side substation facility 24 is a substation facility that converts a voltage and a frequency of electricity generated by the second power generation facility 22. The first power transmission line 25 is a power transmission line connected between the first transmission-side substation facility 23 and the power transmission and distribution system 3, and the second power transmission line 26 is a power transmission line connected between the second transmission-side substation facility 24 and the power transmission and distribution system 3.

In the power transmission system 2, power generated by power generation of the first power generation facility 21 is transmitted from the first power transmission line 25 to the power transmission and distribution system 3 via the first transmission-side substation facility 23, and power generated by power generation of the second power generation facility 22 is transmitted from the second power transmission line 26 to the power transmission and distribution system 3 via the second transmission-side substation facility 24.

The power transmission and distribution system 3 is a system that receives power transmitted from the power transmission system 2 and supplies power to consumers 4, 4A, and 4B in the target region. The power transmission and distribution system 3 includes a first distribution-side substation facility 31, a second distribution-side substation facility 32, and a power distribution line 33.

The first power transmission line 25 is connected to the first distribution-side substation facility 31. The first distribution-side substation facility 31 is a substation facility that converts a voltage and a frequency of electricity transmitted through the first power transmission line 25. The second power transmission line 26 is connected to the second distribution-side substation facility 32. The second distribution-side substation facility 32 is a substation facility that converts a voltage and a frequency of electricity transmitted through the second power transmission line 26. The power distribution line 33 is a power distribution line connected between the first distribution-side substation facility 31 and the second distribution-side substation facility 32 and each of the consumers 4, 4A, and 4B.

The power transmission and distribution system 3 distributes the power transmitted from the power transmission system 2 to the consumers 4, 4A, and 4B through the first distribution-side substation facility 31, the second distribution-side substation facility 32, and the power distribution line 33.

Here, the consumers 4, 4A, and 4B to which power is supplied from the power transmission and distribution system 3 will be described. The consumer 4 is a general house, building, factory, or the like having a load that consumes power supplied from the power transmission and distribution system 3. The consumer 4A is a specific consumer designated as a disaster prevention base which is a base of disaster prevention when a disaster such as wind and flood damage or an earthquake occurs in the target region. Hereinafter, such a consumer is referred to as "specific consumer 4A". The specific consumer 4A is, for example, a public office, a shelter, a medical facility, a communication facility, or the like. In the target region, there are one or more specific consumers 4A. The consumer 4B is a hydrogen production facility installed in the target region. Hereinafter, such a facility is referred to as "hydrogen production facility 4B". The hydrogen production facility 4B is a facility that operates by power supplied from the power transmission and distribution system 3 and electrolyzes water to produce hydrogen. One or more hydrogen production facilities 4B are installed in the target region.

The external power system 5 is an external power transmission and distribution system installed outside the target region. The external power system 5 is connected to the power distribution line 33 of the power transmission and distribution system 3 via a substation facility 50 and an external power transmission system 51. Therefore, power is transmitted to the power transmission and distribution system 3 from the power transmission system 2 installed in the target region, and power is transmitted to the power transmission and distribution system 3 from the external power system 5 installed outside the target region as necessary.

The unmanned flying object 8 is a mobile body having a transport function of transporting a person or a cargo and a power supply function of supplying power to the outside, and using an air route as a movement route, and is a flying object with no man on board, generally referred to as a "drone" or a "multicopter". The energy supply system 1 may include, as a mobile body having the transport function and the power supply function, a mobile body using a land route as a movement route or a mobile body using a sea route as a movement route, instead of the unmanned flying object 8. The number of unmanned flying objects 8 included in the energy supply system 1 is not limited, but the energy supply system 1 desirably includes a plurality of unmanned flying objects 8 in consideration of efficient use of the transport function and the power supply function. The unmanned flying object 8 is not affected by road closure due to traffic congestion, blocking of a road network, or the like, as in a mobile body using a land route as a movement route, and is not restricted to movement at a coastal area as in a mobile body using a sea route as a movement route.

Figure 2:
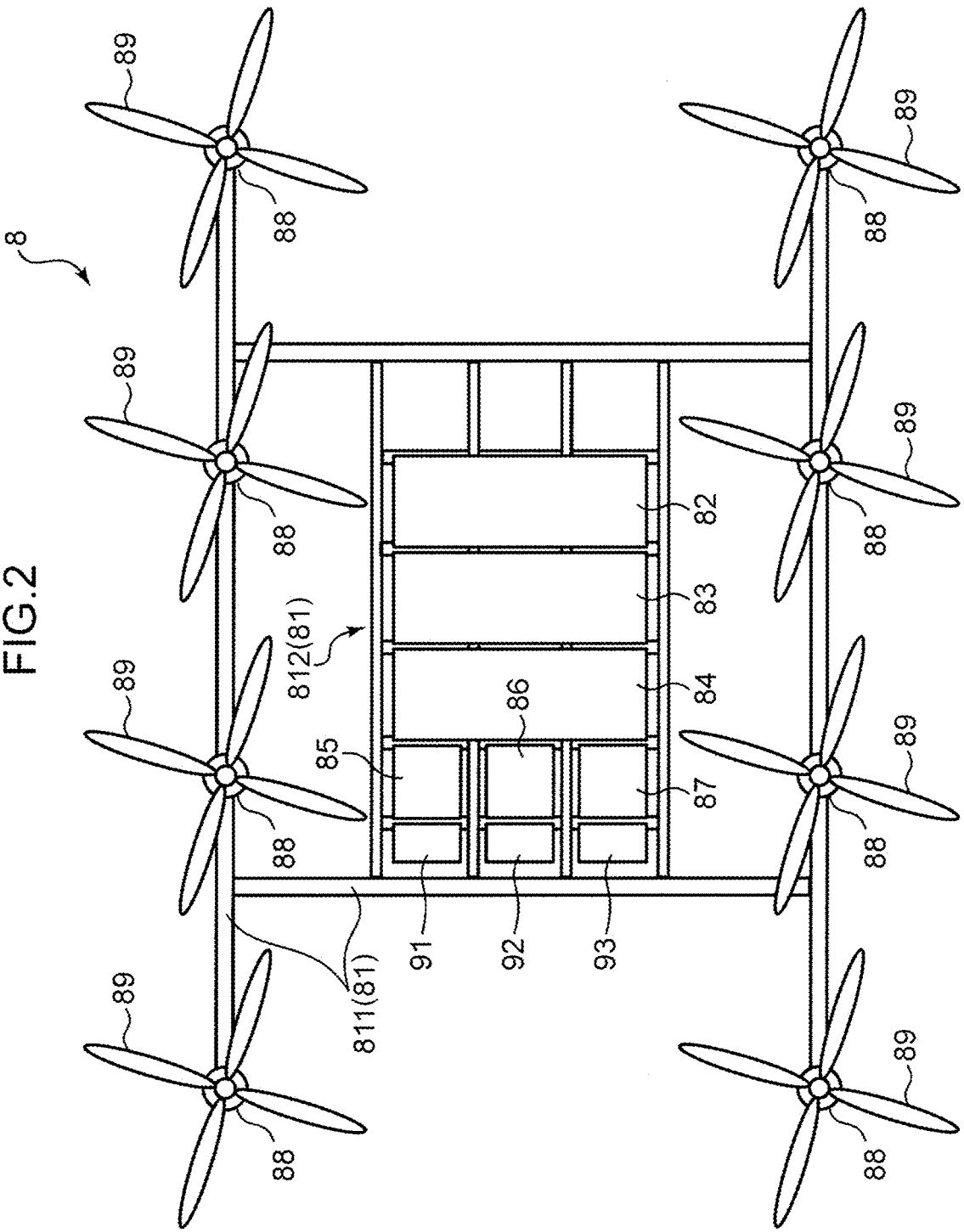
FIG. 2 is a plan view of an unmanned flying object illustrating an example of a mobile body provided in the energy supply system as viewed from above.
Figure 3:
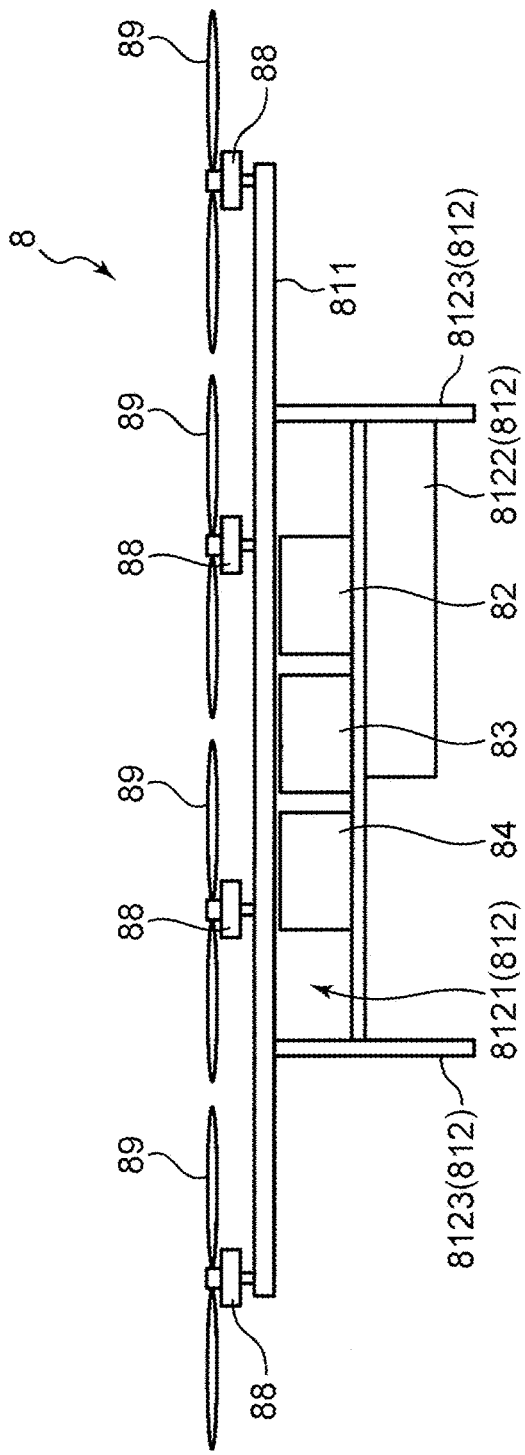
FIG. 3 is a side view of the unmanned flying object.

FIGS. 2 and 3 are views illustrating a configuration of the unmanned flying object 8. FIG. 2 is a plan view of the unmanned flying object 8 as viewed from above, and FIG. 3 is a side view of the unmanned flying object 8. The unmanned flying object 8 according to the present embodiment is a large unmanned flying object of about 7 m square in plan view seen from above. The unmanned flying object 8 includes an airframe 81, and an engine 82, a generator 83, a fuel tank 84, an inverter 85, a battery 86, a converter 87, a motor 88, and a propeller 89 mounted on the airframe 81.

The airframe 81 includes a main frame 811 having a rectangular frame shape in plan view seen from above, and a subframe 812 supported by the main frame 811 inside the main frame 811. A plurality of motors 88 are attached to an upper surface of the main frame 811 at predetermined intervals, and the propeller 89 is connected to each of the motors 88. In an example shown in FIG. 2, eight motors 88 are attached to the upper surface of the main frame 811, and the propeller 89 is connected to each of the motors 88. The subframe 812 includes a mounting section 8121 in which the engine 82, the generator 83, the fuel tank 84, the inverter 85, the battery 86, and the converter 87 are mounted, a storage 8122 capable of storing a person or a cargo in order to implement the transport function of the unmanned flying object 8, and a leg 8123 in contact with the ground or the like when the unmanned flying object 8 lands.

In the unmanned flying object 8, the engine 82 is driven by fuel stored in the fuel tank 84, and the generator 83 generates power by using a driving force of the engine 82 as a power source. The generator 83 is for implementing the power supply function of the unmanned flying object 8. At the time of a flight of the unmanned flying object 8, AC power generated by the generator 83 is converted into DC power by the converter 87 and stored in the battery 86. The DC power stored in the battery 86 is reversely converted into AC power by the inverter 85 as necessary, and is supplied to the motors 88. As a result, the motors 88 rotate, and the propellers 89 rotates in accordance with the rotation of the motors 88 to enable the unmanned flying object 8 to fly.

Figure 4:
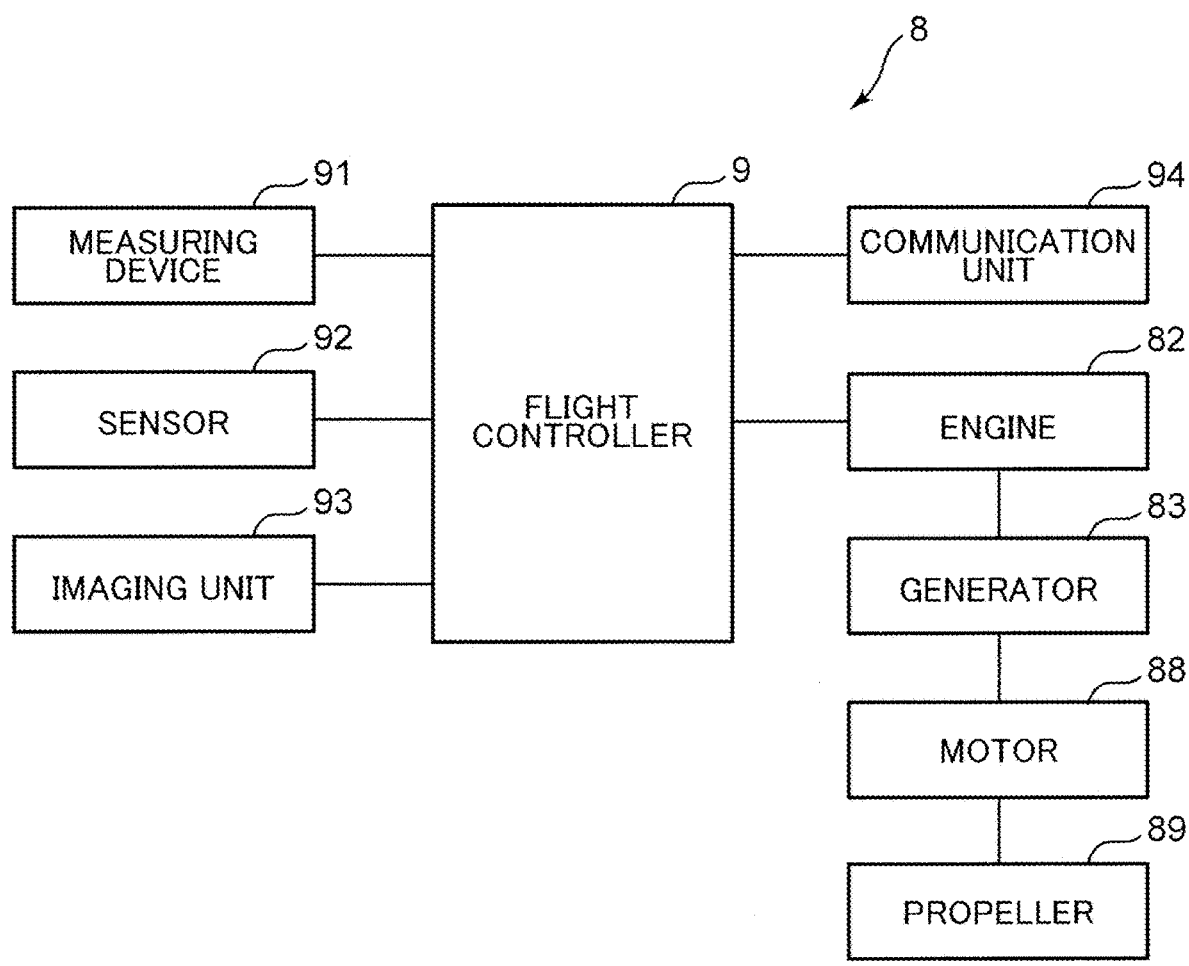
FIG. 4 is a block diagram of a control system of the unmanned flying object.

As shown in the block diagram of FIG. 4, the unmanned flying object 8 further includes a flight controller 9, a measuring device 91, a sensor 92, an imaging unit 93, and a communication unit 94. The flight controller 9, the measuring device 91, the sensor 92, the imaging unit 93, and the communication unit 94 are provided at appropriate positions in the subframe 812.

The measuring device 91 includes a gyro sensor that measures an inclination angle of the airframe 81 with respect to a gravity axis, an altimeter that measures an altitude from the ground on the basis of a reflected wave obtained by transmitting an ultrasonic wave from the airframe 81 toward the ground, and a GPS receiver that measures a position of the airframe 81 on the basis of a reception signal obtained from a satellite group. That is, at the time of the flight of the unmanned flying object 8, the measuring device 91 measures a flight posture with the gyro sensor, measures the altitude from the ground with the altimeter, and measures a flight position with the GPS receiver. A measurement result of the measuring device 91 is input to the flight controller 9. The sensor 92 is a sensor that detects the presence or absence of an obstacle or the like in a vicinity of the airframe 81. The sensor 92 detects the presence or absence of an obstacle or the like in the vicinity of the airframe 81 at the time of takeoff of the unmanned flying object 8, and detects the presence or absence of an obstacle or the like in front of the airframe 81 in a flight direction at the time of the flight of the unmanned flying object 8. A detection result of the sensor 92 is input to the flight controller 9. The imaging unit 93 is an imaging camera that photographs a lower side of the airframe 81. At the time of landing of the unmanned flying object 8, the imaging unit 93 photographs the lower side of the airframe 81 to acquire an image. The image acquired by the imaging unit 93 is input to the flight controller 9. The communication unit 94 performs data communication with the management system 7 installed in the management base 6 described later.

The flight controller 9 monitors the data communication between the communication unit 94 and the management system 7, and controls a flight including takeoff and landing of the unmanned flying object 8 on the basis of the measurement result of the measuring device 91, the detection result of the sensor 92, and image data of the imaging unit 93. The flight controller 9 will be described later in detail.

As shown in FIG. 1, the management system 7 is installed in the management base 6 in the target region. The management base 6 is also a departure base when the mobile body including the unmanned flying object 8 stands by and moves. It is possible to reduce the cost of maintenance and management of the unmanned flying object 8 and the like by integrating a standby place of the mobile body including the unmanned flying object 8 to the management base 6. A management base power transmission line 61 branched from the first power transmission line 25 is connected to the management base 6. When the power supply function of the unmanned flying object 8 standing by at the management base 6 is used, the power generated by the generator 83 of the unmanned flying object 8 is transmitted to the power transmission and distribution system 3 through the management base power transmission line 61. The number of the management bases 6 in the target region is not limited, and may be one base or two or more bases. A location of the management base 6 in the target region is desirably selected in consideration of power supply suitability indicating suitability of the power supply when the power supply function of the unmanned flying object 8 is used, disaster avoidance suitability indicating suitability of disaster avoidance when a disaster occurs in the target region, and the like. For example, the power supply suitability is determined by a separation distance from the first power generation facility 21 installed in the target region, a power transmission capacity of the first power transmission line 25 connected to the first power generation facility 21, and the like.

Figure 5:
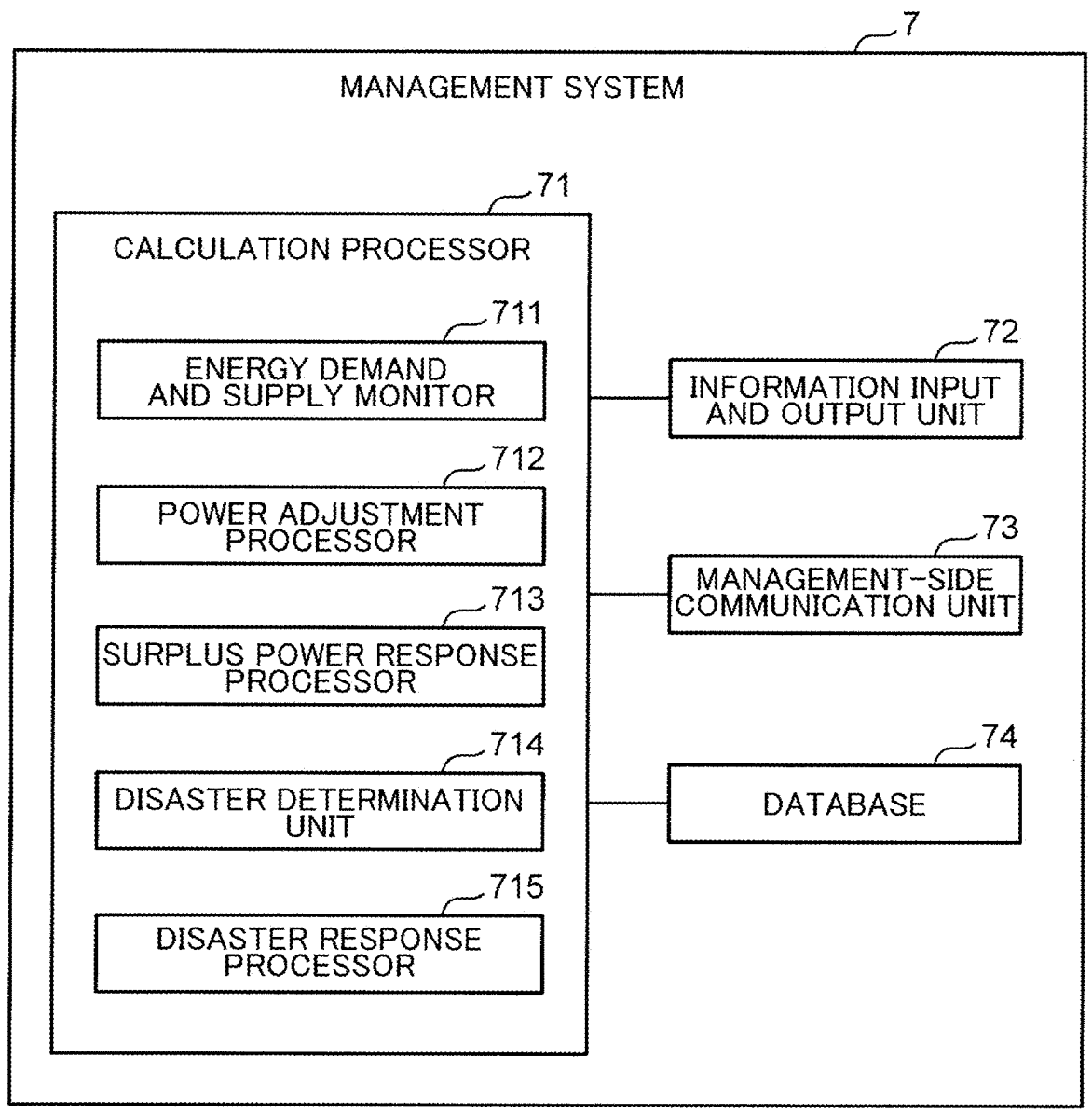
FIG. 5 is a block diagram illustrating a functional configuration of a management system included in the energy supply system.

The management system 7 is a system that manages the power transmission system 2, the power transmission and distribution system 3, and the unmanned flying object 8. As shown in the block diagram of FIG. 5, the management system 7 includes a calculation processor 71, an information input and output unit 72, a management-side communication unit 73, and a database 74.

The management system 7 does not need to be installed in the target region, and all or a part of its functions may be outside the target region. For example, a command signal from a central government agency, a prefectural office, a cloud server, or the like outside the target region may be transmitted to the management base 6.

The information input and output unit 72 receives inputs of disaster index information that is an index of disaster occurrence in the target region and inputs of various information transmitted from the specific consumer 4A. The disaster index information includes information such as a precipitation amount, a river water level, a tide level, a wind speed, earthquake intensity, weather warning information, information indicating blocking of a road network, and the like. When the power supply function of the unmanned flying object 8 is used at the management base 6 or at the specific consumer 4A, the information input and output unit 72 outputs instruction information indicating instruction contents related to handling of the unmanned flying object 8. The instruction information will be described later in detail.

The management-side communication unit 73 performs data communication with the communication unit 94 of the unmanned flying object 8.

The database 74 is a memory unit that stores power supply index data serving as an index for predicting the amount of power supplied by the power transmission system 2 and power demand index data serving as an index for predicting the amount of power required by the power transmission and distribution system 3. The power supply index data includes past data related to the amount of power supplied by the power transmission system 2 for each season, time zone, and weather change, data indicating a power demand and supply plan of the external power system 5 disclosed in a power transaction market and the amount of power contracted for purchase, and data indicating the amount of power generation based on a maintenance plan, maintenance situation, accident information, failure occurrence probability, and the like of the first power generation facility 21 and the second power generation facility 22. The power demand index data includes past data related to the amount of power required by the power transmission and distribution system 3 for each season, day of the week, time zone, event, reservation status of an accommodation facility or a restaurant, mobile terminal position information, weather change, and the like.

The database 74 is not necessarily stored in the memory unit of the management base 6, and may be in a cloud server.

Figure 6:
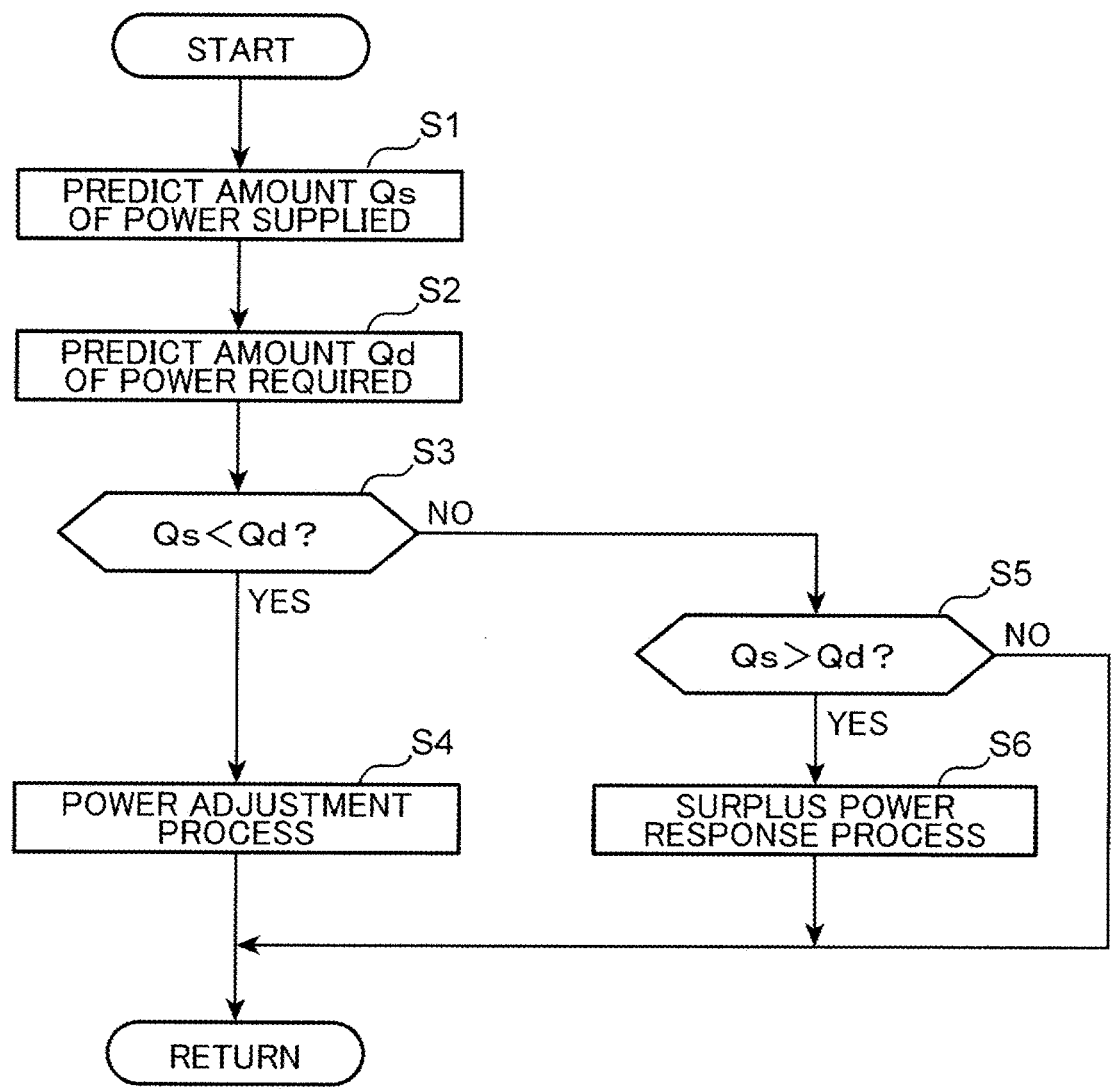
FIG. 6 is a flowchart for describing a power adjustment process and a surplus power response process performed by the management system.
Figure 7:
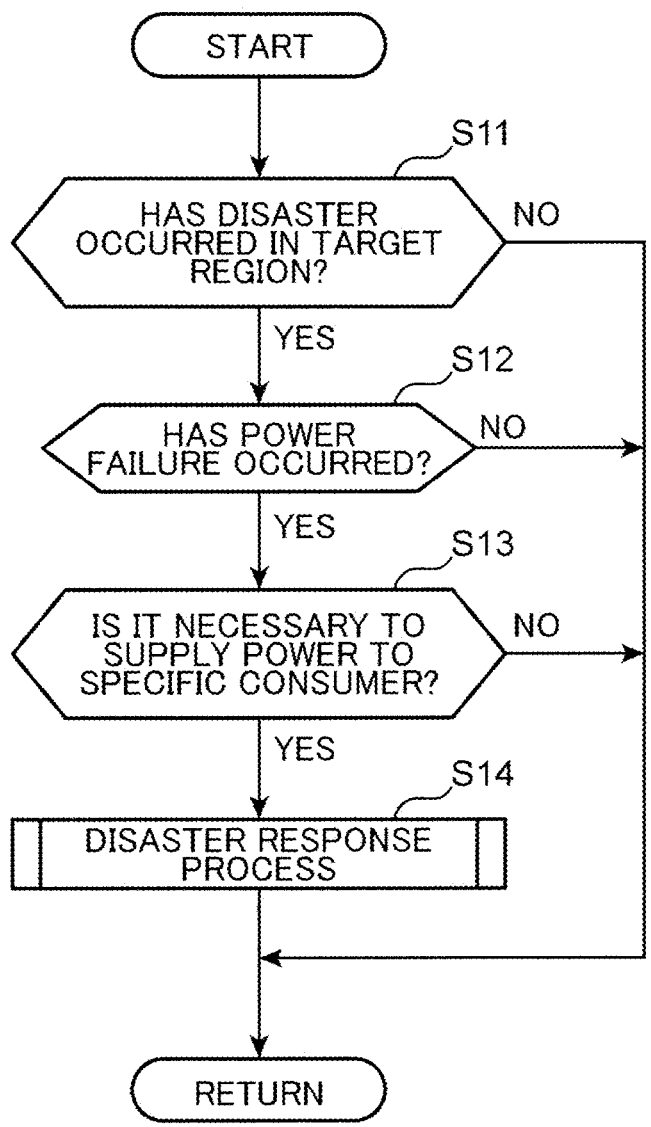
FIG. 7 is a flowchart for describing a disaster response process performed by the management system.

The calculation processor 71 performs various calculation processes for managing the power transmission system 2, the power transmission and distribution system 3, and the unmanned flying object 8. The calculation processor 71 includes, as functional configurations, an energy demand and supply monitor 711, a power adjustment processor 712, a surplus power response processor 713, a disaster determination unit 714, and a disaster response processor 715. The calculation process of the calculation processor 71 will be described with reference to FIGS. 6 to 10. FIG. 6 is a flowchart for describing the power adjustment process and the surplus power response process by the calculation processor 71, and FIGS. 7 to 10 are flowcharts for describing the disaster response process by the calculation processor 71.

First, the power adjustment process and the surplus power response process will be described with reference to the flowchart in FIG. 6. When the process shown in FIG. 6 starts, the energy demand and supply monitor 711 predicts an amount Qs of power supplied by the power transmission system 2 on the basis of the power supply index data stored in the database 74 (step S1), and predicts an amount Qd of power required by the power transmission and distribution system 3 on the basis of the power demand index data stored in the database 74 (step S2). The energy demand and supply monitor 711 may be configured to output notification data for notifying each consumer 4 or the like of a power price on the basis of the predicted amount of power required by the power transmission and distribution system 3. Each consumer 4 can take measures such as suppressing power demand by checking the power price indicated by the notification data.

Next, the energy demand and supply monitor 711 determines whether the amount Qs of power supplied by the power transmission system 2 is less than the amount Qd of power required by the power transmission and distribution system 3 on the basis of a prediction results of steps S1 and S2 (step S3).

Figure 11:
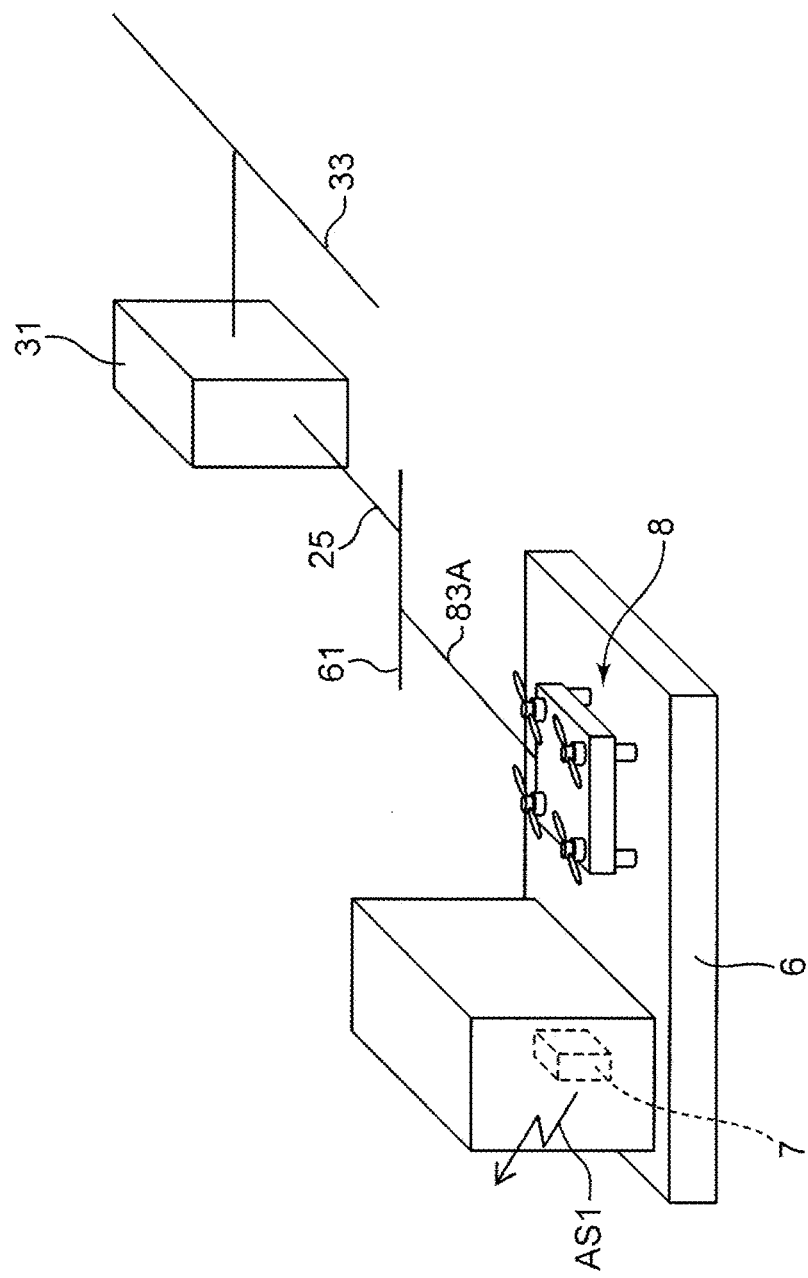
FIG. 11 is a diagram illustrating a state in which power is supplied from the unmanned flying object to a power transmission and distribution system in accordance with the power adjustment process.

When it is determined as YES in step S3 and confirmed that the amount Qs of power supplied is less than the amount Qd of power required, the power adjustment processor 712 performs the power adjustment process of supplying power from the generator 83 of the unmanned flying object 8 to the power transmission and distribution system 3 by using the power supply function of the unmanned flying object 8 (step S4). Specifically, as shown in FIG. 11, the power adjustment processor 712 causes the information input and output unit 72 to output power adjustment instruction information AS1 with the unmanned flying object 8 standing by in the management base 6. The power adjustment instruction information AS1 is instruction information indicating that the power supply function of the unmanned flying object 8 can be used in the management base 6. An operator of the management base 6 can know that the power supply function of the unmanned flying object 8 can be used in the management base 6 by recognizing the power adjustment instruction information AS1. In this case, a predetermined power cable 83A is connected between the generator 83 of the unmanned flying object 8 and the management base power transmission line 61 by the operator, and then, operation for starting driving of the engine 82 of the unmanned flying object 8 is performed. As a result, the generator 83 generates power by using the driving force of the engine 82 as a power source, and the power generated by the power generation is supplied from the unmanned flying object 8 to the power transmission and distribution system 3. The unmanned flying object 8 may be configured to detect the connection of the power cable 83A and automatically drive the engine 82.

As described above, when the amount of power supplied by the power transmission system 2 is less than the amount of power required by the power transmission and distribution system 3 due to an output fluctuation of the first power generation facility 21 using renewable energy, or the like, and there is a shortage of power supplied to the power transmission and distribution system 3, power can be supplied from the unmanned flying object 8 to the power transmission and distribution system 3 by using the power supply function of the unmanned flying object 8. By using the power supply function of the unmanned flying object 8 and utilizing the unmanned flying object 8 as an adjustment power source, the power supply to the power transmission and distribution system 3 can be stabilized. On the other hand, when there is no shortage of power supplied from the power transmission system 2 to the power transmission and distribution system 3, the transport function of the unmanned flying object 8 can be used for the unmanned flying object 8 to transport a person or a cargo. That is, the unmanned flying object 8 is not a facility specialized for power supply when there is a shortage of power supplied to the power transmission and distribution system 3, but the unmanned flying object 8 is effectively utilized as a facility for transporting a person or a cargo in normal times. It is therefore possible to improve use efficiency of the unmanned flying object 8 that can be utilized as an adjustment power source.

When there is a shortage of power supplied to the power transmission and distribution system 3, the power adjustment processor 712 may be configured to calculate an energy cost for procuring power for the shortage from the external power system 5 and an energy cost for using the power supply function of the unmanned flying object 8, and calculate a transportation cost for using the transport function of the unmanned flying object 8 and a transportation cost for using another transportation means. In this case, the power adjustment processor 712 determines a usage mode of the transport function and the power supply function of the unmanned flying object 8 such that a calculated total amount of the energy cost and the transportation cost is minimized.

On the other hand, when it is determined as NO in step S3, the energy demand and supply monitor 711 determines whether the amount Qs of power supplied by the power transmission system 2 is greater than the amount Qd of power required by the power transmission and distribution system 3 (step S5).

When it is determined as YES in step S5 and confirmed that the amount Qs of power supplied is greater than the amount Qd of power required, the surplus power response processor 713 performs the surplus power response process of transmitting surplus power from the power transmission system 2 to the hydrogen production facility 4R. As a result, hydrogen can be produced in the hydrogen production facility 4B by using the surplus power. The hydrogen produced by the hydrogen production facility 4B can be utilized as fuel for a fuel cell power generation facility, for example.

Next, the disaster response process will be described with reference to the flowcharts in FIGS. 7 to 10. When the process shown in FIG. 7 starts, the disaster determination unit 714 determines whether a disaster has occurred in the target region on the basis of the disaster index information input to the information input and output unit 72 (step S11).

When it is determined as YES in step S11 and occurrence of a disaster in the target region is confirmed, the disaster determination unit 714 determines whether a power failure occurs in the power transmission and distribution system 3 (step S12).

When it is determined as YES in step S12 and the power failure in the power transmission and distribution system 3 is confirmed, the disaster determination unit 714 determines whether it is necessary to supply power to the specific consumer 4A (step S13). Specifically, when the power failure in the power transmission and distribution system 3 continues for more than a predetermined time, or when predicted time for recovery from the power failure in the power transmission and distribution system 3 exceeds a predetermined time, the disaster determination unit 714 determines that it is necessary to supply power for a disaster response to the specific consumer 4A. The disaster determination unit 714 may determine that a disaster has occurred by receiving a command signal from the outside such as a central government agency or a prefectural office via the management-side communication unit 73.

When it is determined as YES in step S13, that is, when the occurrence of a disaster in the target region, the power failure in the power transmission and distribution system 3, and the necessity of power supply to the specific consumer 4A are all confirmed, the disaster response processor 715 performs the disaster response process (step S14). Specifically, as the disaster response process, the disaster response processor 715 causes the unmanned flying object 8 to fly to the specific consumer 4A and causes the generator 83 of the unmanned flying object 8 to supply power to a local system 4A1 installed in premises of the specific consumer 4A (see FIGS. 12 to 14). Accordingly, when a power failure occurs in the power transmission and distribution system 3, power can be supplied from the unmanned flying object 8 to the local system 4A1 of the specific consumer 4A. When a disaster occurs in the target region, there is a possibility that, for example, a road network is blocked near the specific consumer 4A to isolate the specific consumer 4A. Even in such a case, the unmanned flying object 8 having the movement route as an air route can move to the specific consumer 4A, and can supply power to the local system 4A1 of the specific consumer 4A. Furthermore, a cargo such as daily necessities is stored in the storage 8122 of the unmanned flying object 8, and the unmanned flying object 8 moves to the specific consumer 4A in that state, and the daily necessities, medicine, and other various supplies can be transported.

The disaster response process by the disaster response processor 715 and the control of the unmanned flying object 8 by the flight controller 9 according to the disaster response process will be specifically described below.

Figure 8:
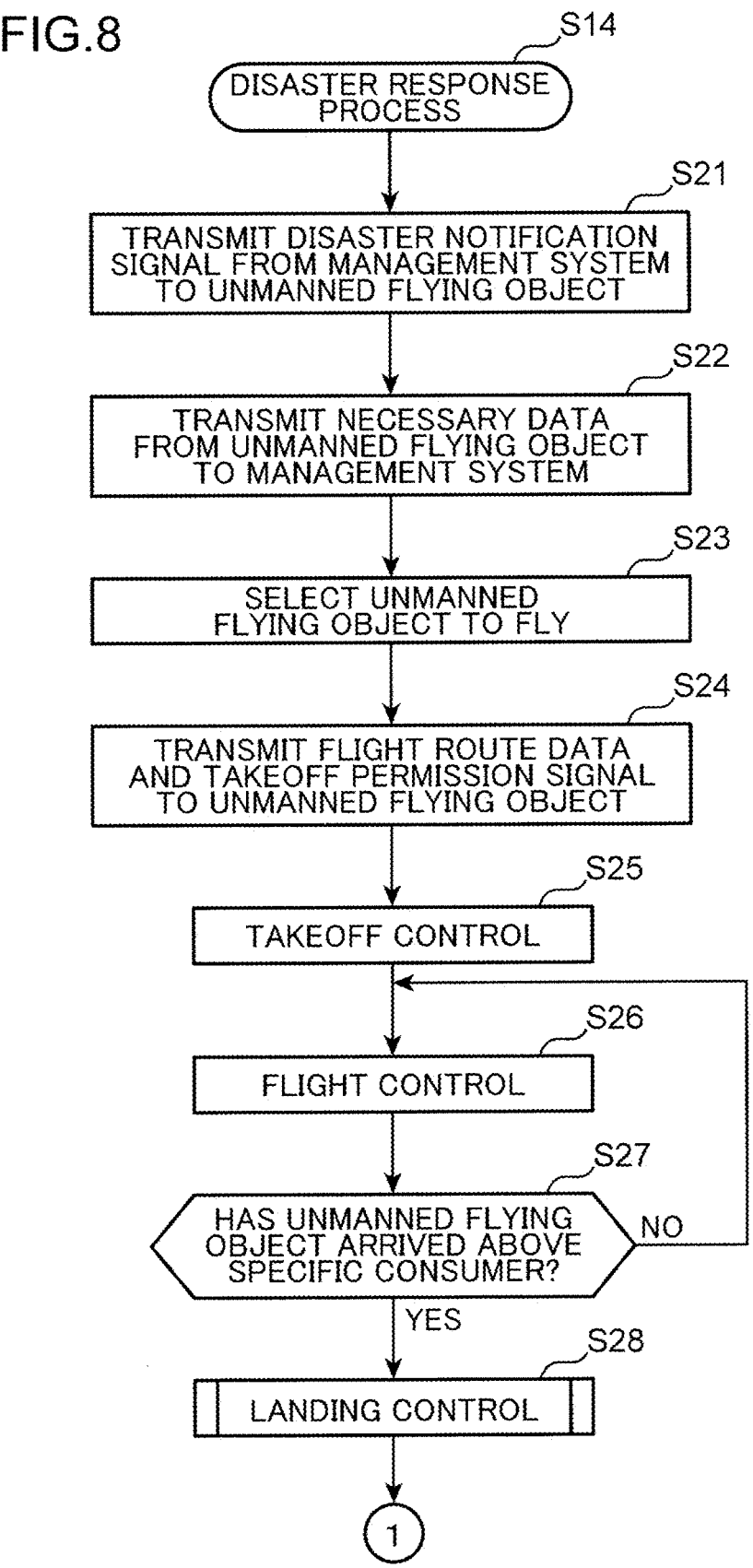
FIG. 8 illustrates a first half of a subroutine showing details of the disaster response process.
Figure 9:
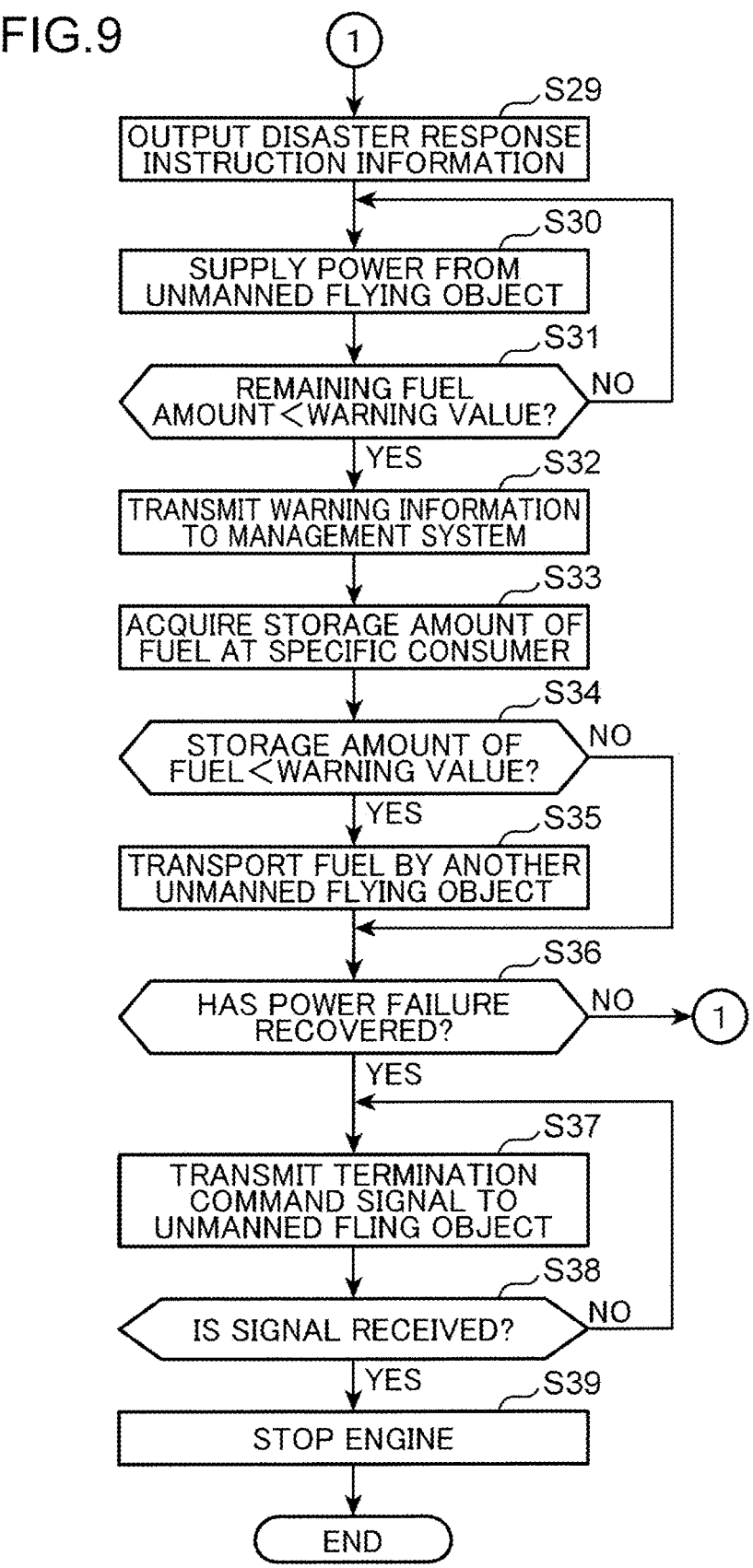
FIG. 9 illustrates a second half of the subroutine showing details of the disaster response process.

FIGS. 8 and 9 illustrate subroutines showing details of the disaster response process in step S14. When the process shown in FIGS. 8 and 9 is started, the disaster response processor 715 causes the management-side communication unit 73 to transmit a disaster notification signal for notifying that power supply for disaster to the specific consumer 4A is necessary to the unmanned flying object 8 (step S21). When a plurality of unmanned flying objects 8 are standing by at the management base 6, the disaster notification signal is transmitted to all the unmanned flying objects 8.

Figure 12:
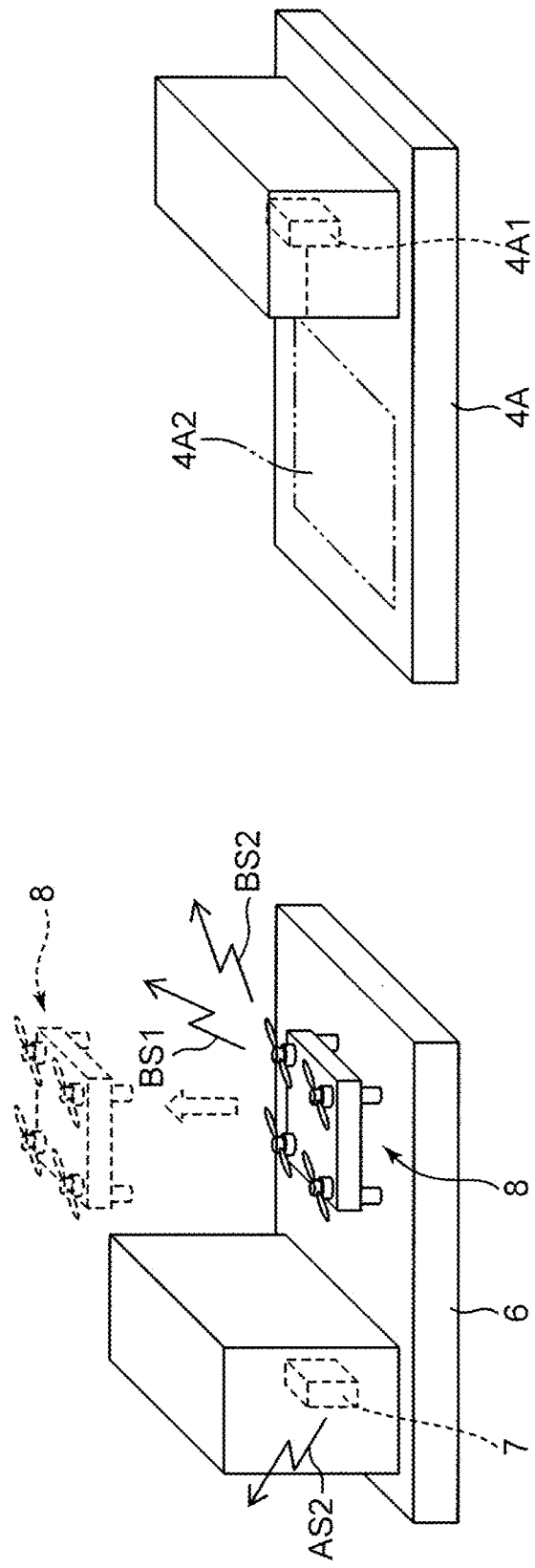
FIG. 12 is a diagram illustrating a state when the unmanned flying object takes off from a management base in accordance with the disaster response process.

The transmitted disaster notification signal is received by the communication unit 94 of the unmanned flying object 8. In response to the reception, the flight controller 9 of the unmanned flying object 8 causes the communication unit 94 to transmit pre-takeoff detection data BS1 indicating a detection result of the vicinity of the airframe 81 by the sensor 92 before takeoff and remaining fuel data BS2 indicating a remaining fuel amount in the fuel tank 84 to the management system 7 as shown in FIG. 12 (step S22).

The transmitted pre-takeoff detection data BS1 and remaining fuel data BS2 are received by the management-side communication unit 73. In response to the reception, the disaster response processor 715 selects the unmanned flying object 8 to fly to the specific consumer 4A (step S23). At this time, on the basis of the pre-takeoff detection data BS1, the disaster response processor 715 determines that the unmanned flying object 8 having no obstacle or the like in the vicinity of the airframe 81 is the unmanned flying object 8 having no hindrance to taking off. An administrator of the management system 7 may determine that the unmanned flying object 8 has no hindrance to taking off by referring to the pre-takeoff detection data BS1.

The disaster response processor 715 selects, as the unmanned flying object 8 to fly to the specific consumer 4A, the unmanned flying object 8 in which the remaining fuel amount indicated by the remaining fuel data BS2 is not less than a sum of fuel for flight and fuel for power generation for disaster response, and required time for arriving at the specific consumer 4A after taking off from the management base 6 does not exceed a predetermined time. The fuel for flight is fuel required for reciprocating between the management base 6 and the specific consumer 4A, and the fuel for power generation for disaster response is fuel required for power generation during power supply to the specific consumer 4A. When a fuel stock amount at the specific consumer 4A is sufficiently secured, the unmanned flying object 8 having a remaining fuel amount necessary for outward travel from the management base 6 to the specific consumer 4A may be selected.

Here, when power is supplied from the generator 83 of the unmanned flying object 8 to the local system 4A1 of the specific consumer 4A, an inverter may be required. For example, there is a case where a voltage of generated power by the generator 83 is different from a voltage that can be used in the local system 4A1. In this case, it is necessary to prepare an inverter at the specific consumer 4A. However, the inverter is not necessarily prepared for all the specific consumers 4A. It is therefore desirable to register information indicating the presence or absence of the inverter at the specific consumer 4A in the database 74 in advance. Thus, the operator of the management base 6 can confirm whether the inverter exists at the specific consumer 4A before the flight of the unmanned flying object 8 on the basis of the information registered in the database 74. As a result of the confirmation, when it is found that the inverter does not exist at the specific consumer 4A, the operator mounts the inverter on the unmanned flying object 8. It is therefore possible to smoothly advance the power supply after the unmanned flying object 8 arrives at the specific consumer 4A.

When the selection of the unmanned flying object 8 to fly to the specific consumer 4A is completed in step S23, the disaster response processor 715 causes the management-side communication unit 73 to transmit flight route data AS2 (FIG. 12) indicating a flight route from the management base 6 to the specific consumer 4A and a takeoff permission signal to the selected unmanned flying object 8 (step S24). When the selected unmanned flying object 8 is used for the power adjustment process by the power adjustment processor 712, the disaster response processor 715 stops the use of the unmanned flying object 8 corresponding to the power adjustment process, and prioritizes the flight to the specific consumer 4A by transmitting the flight route data AS2 and the takeoff permission signal.

The flight route data AS2 and the takeoff permission signal that have been transmitted are received by the communication unit 94 of the unmanned flying object 8. In response to the reception, the flight controller 9 of the unmanned flying object 8 performs takeoff control to start the engine 82 and cause the airframe 81 to take off from the management base 6 as shown in FIG. 12 (step S25). Specifically, the flight controller 9 causes the generator 83 to generate power by using the driving force of the started engine 82 as a power source, and rotates the motor 88 by the generated power. Then, the propeller 89 is rotationally driven by the motor 88, and the unmanned flying object 8 takes off. After the takeoff, the flight controller 9 performs flight control to fly the airframe 81 to the specific consumer 4A along the flight route indicated by the flight route data AS2 while monitoring the measurement result of the measuring device 91 and the detection result of the sensor 92 (step S26).

Next, the flight controller 9 determines whether the unmanned flying object 8 has arrived above the specific consumer 4A (step S27), and performs landing control of the unmanned flying object 8 when the arrival is confirmed (step S28).

Figure 10:
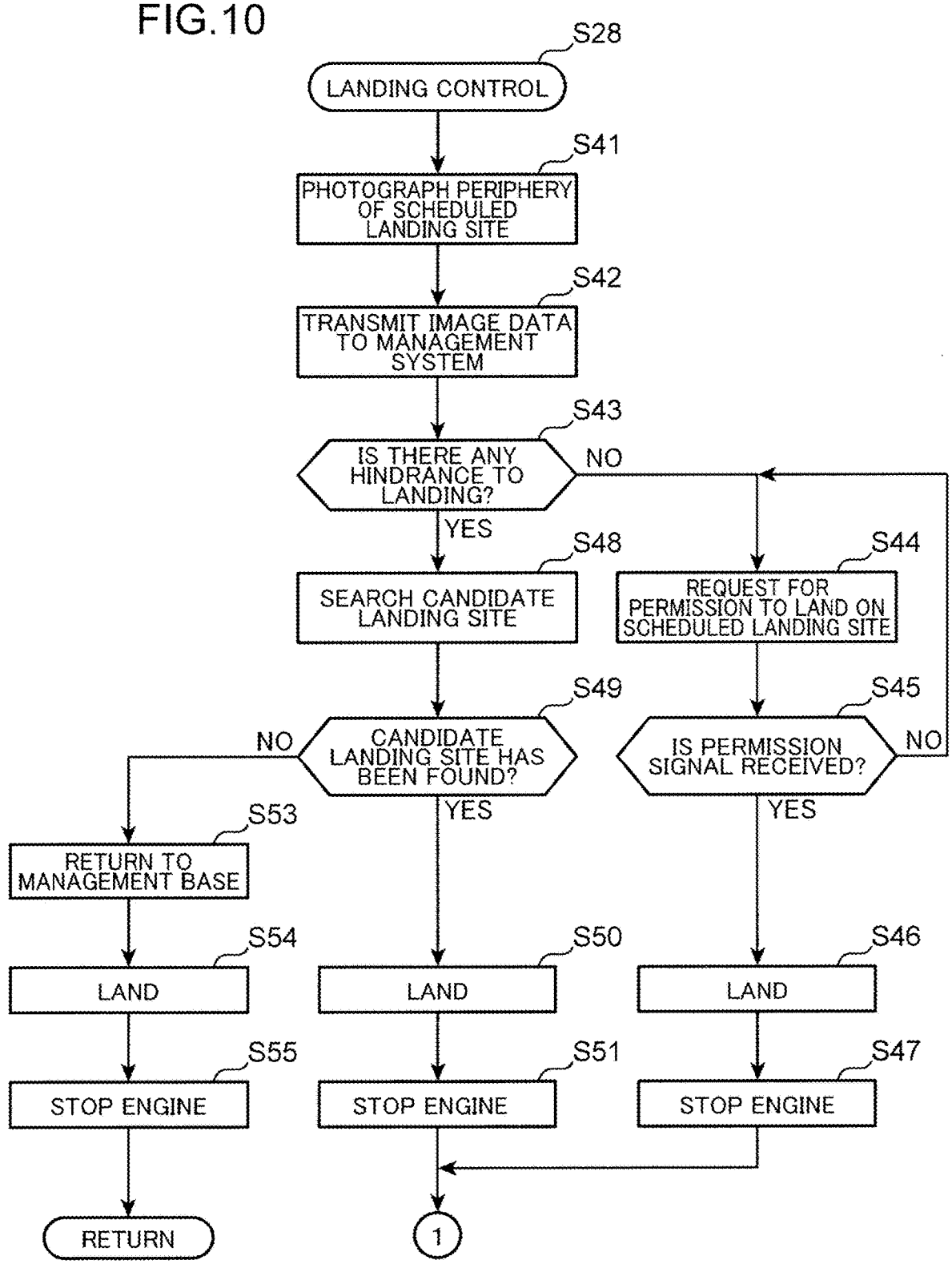
FIG. 10 illustrates a subroutine showing details of landing control of the unmanned flying object.
Figure 13:
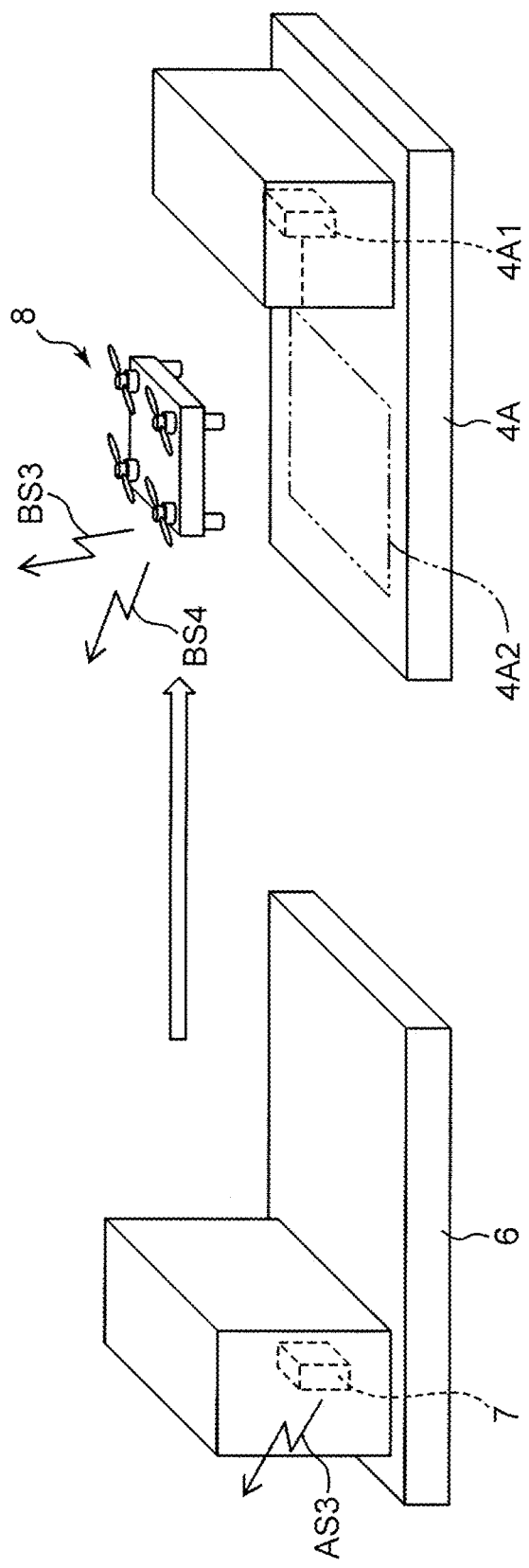
FIG. 13 is a diagram illustrating a state when the unmanned flying object flies in accordance with the disaster response process and arrives above a scheduled landing site.

FIG. 10 illustrate a subroutine showing details of the landing control in step S28. When the control shown in FIG. 10 is started, as shown in FIG. 13, the flight controller 9 causes the imaging unit 93 to photograph a periphery of a predetermined scheduled landing site 4A2 set in or near the premises of the specific consumer 4A (step S41), and causes the communication unit 94 to transmit image data BS3 of a peripheral image obtained by the photographing to the management system 7 (step S42). Furthermore, the flight controller 9 determines whether there is any hindrance to landing on the scheduled landing site 4A2 on the basis of the peripheral image data BS3 (step S43). Instead of the flight controller 9, the management system 7 may determine whether there is any hindrance to landing.

When it is determined as NO in step S43 and confirmed that there is no hindrance to landing on the scheduled landing site 4A2, the flight controller 9 causes the communication unit 94 to transmit a landing permission request signal BS4 requesting permission for landing to the management system 7 (step S44).

The peripheral image data BS3 and the landing permission request signal BS4 transmitted from the unmanned flying object 8 are received by the management-side communication unit 73. In response to the reception, the administrator of the management system 7 inputs an instruction to transmit a landing permission signal AS3 in response to the landing permission request signal BS4. In response to this instruction, the disaster response processor 715 causes the management-side communication unit 73 to transmit the landing permission signal AS3 to the unmanned flying object 8. The flight controller 9 of the unmanned flying object 8 determines whether the transmitted landing permission signal AS3 has been received by the communication unit 94 (step S45), and when the reception is confirmed, the flight controller 9 causes the airframe 81 to land on the scheduled landing site 4A2 (step S46), and then stops the engine 82 (step S47).

As described above, as part of the disaster response process by the disaster response processor 715, the flight controller 9 performs the takeoff control (S25) for causing the unmanned flying object 8 to take off, the flight control (S26) for flying the unmanned flying object 8 along the flight route indicated by the flight route data AS2, and the landing control (S28) for causing the unmanned flying object 8 to land. The unmanned flying object 8 can automatically perform a flight including takeoff and landing under the control by the flight controller 9.

Figure 15:
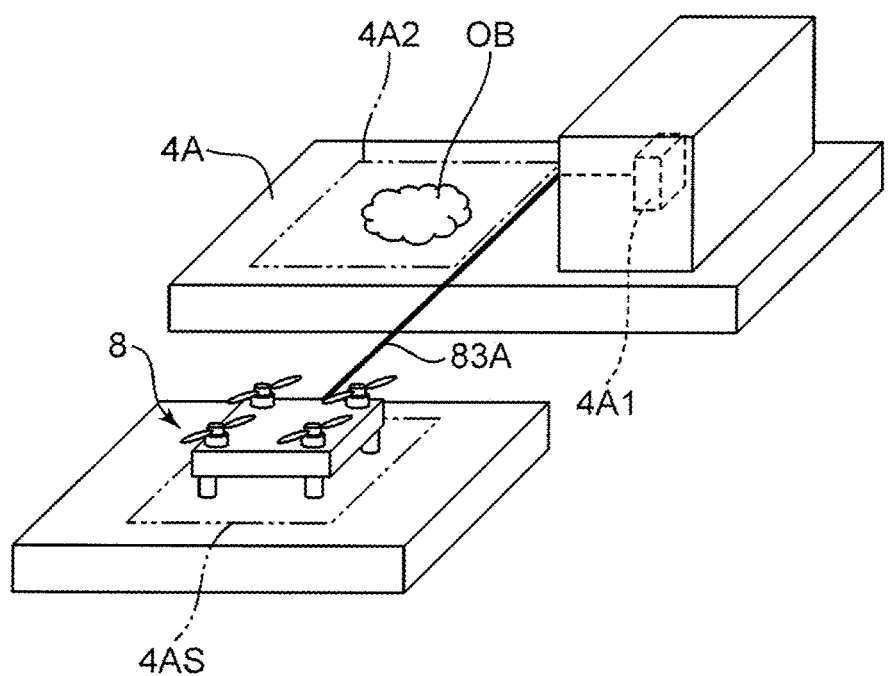
FIG. 15 is a diagram illustrating a state in which the unmanned flying object lands on a candidate landing site in response to the presence of an obstacle in the scheduled landing site, and in this state, power is supplied from the unmanned flying object to the local system of the specific consumer.

Here, depending on the disaster occurring in the target region, damage such as water immersion or falling of an obstacle OB may occur at the scheduled landing site 4A2 of the specific consumer 4A (see FIG. 15). When such a disaster occurs, the flight controller 9 determines that there is a hindrance to landing on the scheduled landing site 4A2 on the basis of the peripheral image data BS3 (YES in step S43). Then, the flight controller 9 searches for a candidate landing site 4AS where a distance from the scheduled landing site 4A2 is within a predetermined allowable range and there is no obstacle to landing (step S48), and determines whether the candidate landing site 4AS has been found by the search (step S49).

When it is determined as YES in step S49 and confirmed that the candidate landing site 4AS has been found, the flight controller 9 transmits and receives a landing permission request signal and a landing permission signal to and from the management system 7 as in steps S44 and S45, thereafter, causes the airframe 81 to land on the candidate landing site 4AS (step S50), and then stops the engine 82 (step S51).

On the other hand, when it is determined as NO in step S49 and confirmed that the candidate landing site 4AS has not been found, the flight controller 9 flies the airframe 81 in a direction of returning to the management base 6 (step S53). When the airframe 81 arrives above the management base 6 along with the flight, the flight controller 9 causes the airframe 81 to land on the management base 6 (step S54), and then stops the engine 82 (step S55).

The process after the unmanned flying object 8 lands on the scheduled landing site 4A2 or the candidate landing site 4AS by the landing control as described above will be described with reference to FIG. 9. After landing on the scheduled landing site 4A2 or the candidate landing site 4AS, the disaster response processor 715 causes the information input and output unit 72 to output disaster response instruction information AS4 (FIG. 14)(step S29). The disaster response instruction information AS4 is instruction information indicating that the power supply function of the unmanned flying object 8 can be used at the specific consumer 4A. The disaster response instruction information AS4 is transmitted from the information input and output unit 72 to the specific consumer 4A. An operator at the specific consumer 4A can know that the power supply function of the unmanned flying object 8 can be used at the specific consumer 4A by recognizing the disaster response instruction information AS4. In a case where the unmanned flying object 8 lands at the specific consumer 4A when a disaster occurs in the target region, it may be made a rule in advance that the power supply function of the unmanned flying object 8 can be used. In this case, the output of the disaster response instruction information AS4 from the information input and output unit 72 is omitted.

The operator at the specific consumer 4A performs operation of connecting the predetermined power cable 83A between the generator 83 of the unmanned flying object 8 that has landed on the scheduled landing site 4A2 or the candidate landing site 4AS and the local system 4A 1, and then starting driving of the engine 82 of the unmanned flying object 8. As a result, the generator 83 generates power by using the driving force of the engine 82 as a power source, and the power generated by the power generation is supplied from the unmanned flying object 8 to the local system 4A1 (step S30). The unmanned flying object 8 may be configured to detect the connection of the power cable 83A and automatically drive the engine 82.

Here, at the specific consumer 4A, there may be a unique power source capable of supplying power to the local system 4A1 during a power failure of the power transmission and distribution system 3. Examples of such a unique power source include a power generation facility using renewable energy and a storage battery prepared for disaster countermeasures. In a case where such a unique power source exists at the specific consumer 4A, power is desirably supplied from the generator 83 to the local system A1 in the following procedure.

First, the disaster response processor 715 refers to the database 74 to determine whether the unique power source (a power generation facility using renewable energy, a storage battery, or the like) connected to the local system 4A1 exists at the specific consumer 4A. When it is confirmed that the unique power source exists by this determination, the disaster response processor 715 causes the management-side communication unit 73 to transmit, to the specific consumer 4A, a reference voltage and a reference frequency for enabling the unique power source and the generator 83 to supply power to the local system 4A1 in synchronization with each other. In response to this transmission, the unique power source at the specific consumer 4A adjusts a voltage and frequency of AC power supplied by the specific consumer 4A to values matching the reference voltage and the reference frequency. The process of causing the unique power source to adjust the voltage and frequency in this manner may be performed by a control system provided at the specific consumer 4A or may be performed by the management system 7 (disaster response processor 715).

During power supply from the unmanned flying object 8 to the local system 4A1, the flight controller 9 monitors the remaining fuel amount in the fuel tank 84. Specifically, the flight controller 9 determines whether the remaining fuel amount in the fuel tank 84 is less than a predetermined warning value (step S31), and when it is confirmed that the remaining fuel amount is less than the predetermined warning value, the flight controller 9 causes the communication unit 94 to transmit remaining fuel amount warning information indicating that the remaining fuel amount is small to the management system 7 (step S32).

When the management-side communication unit 73 receives the remaining fuel amount warning information, the disaster response processor 715 acquires fuel storage amount information indicating a storage amount of fuel stored at the specific consumer 4A via the information input and output unit 72 (step S33). The disaster response processor 715 determines whether the storage amount of the fuel indicated by the fuel storage amount information is less than a predetermined warning value (step S34), and when it is confirmed that the storage amount of the fuel is less than the predetermined warning value, the disaster response processor 715 causes another unmanned flying object 8 standing by at the management base 6 to transport the fuel to the specific consumer 4A by using the transport function of the another unmanned flying object 8 (step S35). This enables refueling to the specific consumer 4A. The fuel storage amount information may be transmitted to the outside via the management-side communication unit 73, and an external device may centrally manage the fuel storage amount information of each region.

The unmanned flying object 8 may include a notification mechanism such as an indicator lamp for notifying the operator at the specific consumer 4A of the remaining fuel amount warning information. In this case, the operator at the specific consumer 4A can know that the remaining fuel amount of the unmanned flying object 8 during the power supply to the local system 4A1 is small, and accordingly, can replenish the unmanned flying object 8 with the fuel stored at the specific consumer 4A.

In the management system 7, the disaster determination unit 714 determines whether the power failure of the power transmission and distribution system 3 has been recovered (step S36). When it is determined as YES in step S36 and confirmed that the power failure has been recovered, that is, when it is confirmed that the power supply to the specific consumer 4A for disaster response is unnecessary, the disaster response processor 715 causes the management-side communication unit 73 to transmit a termination command signal for commanding termination of the power supply for disaster response to the unmanned flying object 8 (step S37). The flight controller 9 of the unmanned flying object 8 determines whether the termination command signal has been received by the communication unit 94 (step S38), and when the reception is confirmed, the flight controller 9 stops the engine 82 and terminates the power supply for disaster response (step S39). In this way, the unmanned flying object 8 can automatically terminate the power supply for disaster response under the control by the flight controller 9.

After the engine 82 of the unmanned flying object 8 is stopped, the connection of the power cable 83A between the generator 83 and the local system 4A1 is disconnected by the operator at the specific consumer 4A. After the completion of the disconnection, the flight controller 9 may be configured to calculate a fuel amount necessary for the flight from the specific consumer 4A to the management base 6, and notify the operator at the specific consumer 4A of information on the calculated value by the notification mechanism or the like. In this case, the operator at the specific consumer 4A can replenish the unmanned flying object 8 with fuel necessary for the unmanned flying object 8 to return to the management base 6. Thereafter, the flight controller 9 executes the takeoff control at the time of takeoff from the specific consumer 4A at the unmanned flying object 8, the flight control at the time of flight from the specific consumer 4A to the management base 6, and the landing control at the time of landing on the management base 6. As a result, the unmanned flying object 8 automatically returns from the specific consumer 4A to the management base 6.

SUMMARY

The above-described specific embodiment mainly includes the disclosure having the following configurations.

An energy supply system according to one aspect of the present disclosure includes a power transmission system which is installed in a target region and includes a first power generation facility that generates power by using renewable energy and a second power generation facility that generates power by using fossil fuel, a power transmission and distribution system to which power is transmitted from the power transmission system and that supplies power to a consumer in the target region, a mobile body having a transport function of transporting a cargo and a power supply function of supplying power to an outside, and a management system that manages the power transmission system, the power transmission and distribution system, and the mobile body. The management system predicts an amount of power supplied by the power transmission system and an amount of power required by the power transmission and distribution system, and performs a power adjustment process of supplying power from the mobile body to the power transmission and distribution system by using the power supply function of the mobile body when the amount of power supplied is less than the amount of power required.

In the energy supply system, when the amount of power supplied by the power transmission system is less than the amount of power required by the power transmission and distribution system due to an output fluctuation of the first power generation facility using renewable energy or the like, and there is a shortage of power supplied to the power transmission and distribution system, power can be supplied from the mobile body to the power transmission and distribution system by using the power supply function of the mobile body. As described above, by using the power supply function of the mobile body and utilizing the mobile body as an adjustment power source, the power supply to the power transmission and distribution system can be stabilized. On the other hand, when there is no shortage of power supplied from the power transmission system to the power transmission and distribution system, the transport function of the mobile body can be used for the mobile body to transport a cargo. That is, the mobile body is not a facility specialized for power supply when there is a shortage of power supplied to the power transmission and distribution system, but the mobile body is effectively utilized as a facility for transporting a cargo in normal times. It is therefore possible to improve use efficiency of the mobile body that can be utilized as an adjustment power source.

The energy supply system may further include a hydrogen production facility that is installed in the target region and electrolyzes water to produce hydrogen. In this case, when the amount of power supplied by the power transmission system exceeds the amount of power required by the power transmission and distribution system, the management system preferably performs a surplus power response process of transmitting surplus power from the power transmission system to the hydrogen production facility.

In this aspect, hydrogen can be produced in the hydrogen production facility by using the surplus power. The hydrogen produced by the hydrogen production facility can be utilized as fuel for a fuel cell power generation facility, for example.

In the energy supply system, the mobile body may be an unmanned flying object including an airframe, an engine mounted on the airframe, a generator mounted on the airframe and configured to implement the power supply function, and a storage configured to store a cargo for implementing the transport function.

In this aspect, the unmanned flying object is a mobile body using an air route as a movement route. The unmanned flying object as described above is not affected by road closure due to traffic congestion, blocking of a road network, or the like, as in a mobile body using a land route as a movement route, and is not restricted to movement at a coastal area as in a mobile body using a sea route as a movement route.

In the energy supply system, the management system may perform a disaster response process of supplying power from the unmanned flying object to a specific consumer designated as a disaster prevention base in the target region in a case where a power failure occurs in the power transmission and distribution system when a disaster occurs in the target region. Preferably, the disaster response process is a process of flying the unmanned flying object along a predetermined flight route to the specific consumer, and supplying power from the generator of the unmanned flying object to a local system installed in premises of the specific consumer.

In this aspect, in a case where a power failure occurs in the power transmission and distribution system when a disaster occurs in the target region, power can be supplied from the generator of the unmanned flying object to the local system of the specific consumer designated as the disaster prevention base. When a disaster occurs in the target region, there is a possibility that, for example, a road network is blocked near the specific consumer to isolate the specific consumer. Even in such a case, the unmanned flying object having the movement route as an air route can move to the specific consumer, and can supply power to the local system of the specific consumer. Furthermore, a cargo such as daily necessities is stored in the storage of the unmanned flying object, and the unmanned flying object moves to the specific consumer in that state, and the daily necessities and the like can be transported.

A unique power source capable of supplying AC power to the local system may exist at the specific consumer during a power failure of the power transmission and distribution system. In this case, the management system preferably transmits, to the specific consumer, a reference voltage and a reference frequency for the unique power source and the generator to supply the AC power to the local system in synchronization each other during the disaster response process.

In this aspect, it is possible for the unique power source provided in the specific consumer to supply power to the local system in synchronization with the generator of the unmanned flying object.

In the energy supply system, the unmanned flying object may further include an imaging unit, a communication unit that performs data communication with the management system, and a flight controller that controls a flight including takeoff and landing. In this case, preferably, in response to reception, by the communication unit, of the flight route and a takeoff permission signal transmitted from the management system along with a start of the disaster response process, the flight controller performs takeoff control to start the engine and cause the airframe to take off from a departure base, the flight controller performs flight control to fly the airframe to the specific consumer along the flight route after takeoff, the flight controller performs landing control to cause the airframe to land at the specific consumer when the airframe arrives above the specific consumer by the flight control. Specifically, the landing control causes the imaging unit to photograph a periphery of a predetermined scheduled landing site and transmit a peripheral image acquired by the photographing to the management system via the communication unit, and upon receipt of a landing permission signal from the management system, the landing control causes the airframe to land at the specific consumer and stops the engine.

In response to reception, by the communication unit, of the flight route transmitted from the management system along with a start of the disaster response process, the flight controller may perform takeoff control to start the engine and cause the airframe to take off from a departure base, the flight controller may perform flight control to fly the airframe to the specific consumer along the flight route after takeoff, the flight controller may perform landing control to cause the airframe to land at the specific consumer when the airframe arrives above the specific consumer by the flight control. Specifically, the landing control causes the imaging unit to photograph a periphery of a predetermined scheduled landing site and transmit a peripheral image acquired by the photographing to the management system via the communication unit, and the landing control determines whether there is any hindrance to landing on the scheduled landing site based on the peripheral image, and causes the airframe to land at the specific consumer and stops the engine when there is no hindrance.

In this aspect, the unmanned flying object includes a flight controller, and the flight controller performs takeoff control at the time of takeoff of the unmanned flying object, flight control during flight along a predetermined flight route, and landing control at the time of landing. The unmanned flying object can automatically perform a flight including takeoff and landing under the control by the flight controller.

In the energy supply system, when it is confirmed that there is a hindrance to landing on the scheduled landing site in the landing control, the flight controller, based on the peripheral image, may search for a candidate landing site where a distance from the scheduled landing site is within a predetermined allowable range and there is no hindrance to landing, when the candidate landing site is found, the flight controller may cause the airframe to land on the candidate landing site and stop the engine, and when the candidate landing site is not found, the flight controller may fly the airframe in a direction of returning to the departure base, cause the airframe to land on the departure base, and stop the engine.

When a disaster occurs in the target region, there is a possibility that damage such as water immersion and falling of an obstacle may occur at the scheduled landing site of the specific consumer. In this case, there may be a hindrance to landing of the unmanned flying object at the scheduled landing site. Therefore, under the control by the flight controller, the unmanned flying object automatically searches for a candidate landing site where there is no hindrance to landing, and automatically lands on the candidate landing site when the candidate landing site is found, and returns to the departure base and automatically lands on the departure base when the candidate landing site is not found.

The invention claimed is:

1. An energy supply system comprising:
    a power transmission system which is installed in a target region and includes a first power generation facility that generates power by using renewable energy and a second power generation facility that generates power by using fossil fuel;
    a power transmission and distribution system to which power is transmitted from the power transmission system and that supplies power to a consumer in the target region;
    a mover having a transport function of transporting a cargo and a power supply function of supplying power to an outside of the mover; and
    a management system that manages the power transmission system, the power transmission and distribution system, and the mover, wherein
    the power transmission system includes:
        a first power transmission line that transmits power generated by power generation of the first power generation facility to the power transmission and distribution system via a first transmission-side substation facility; and
        a second power transmission line that transmits power generated by power generation of the second power generation facility to the power transmission and distribution system via a second transmission-side substation facility,
    the mover is connectable to the first power transmission line, and
    the management system predicts an amount of power supplied by the power transmission system and an amount of power required by the power transmission and distribution system, and supplies power from the mover to the power transmission and distribution system by using the power supply function of the mover when the amount of power supplied is less than the amount of power required.

2. The energy supply system according to claim 1, further comprising a hydrogen production facility that is installed in the target region and electrolyzes water to produce hydrogen,
    wherein when the amount of power supplied by the power transmission system exceeds the amount of power required by the power transmission and distribution system, the management system transmits surplus power from the power transmission system to the hydrogen production facility.

3. The energy supply system according to claim 1, wherein the mover is an unmanned aircraft including an airframe, an engine mounted on the airframe, a generator mounted on the airframe and configured to implement the power supply function, and a storage configured to store a cargo for implementing the transport function.

4. The energy supply system according to claim 3, wherein
    the management system performs a disaster response process of supplying power from the unmanned aircraft to a specific consumer designated as a disaster prevention base in the target region in a case where a power failure occurs in the power transmission and distribution system when a disaster occurs in the target region, and
    the disaster response process is a process of flying the unmanned aircraft along a predetermined flight route to the specific consumer, and supplying power from the generator of the unmanned aircraft to a local system installed in premises of the specific consumer.

5. The energy supply system according to claim 4, wherein in a case where a unique power source capable of supplying AC power to the local system exists at the specific consumer during a power failure of the power transmission and distribution system, the management system transmits, to the specific consumer, a reference voltage and a reference frequency for the unique power source and the generator to supply AC power to the local system in synchronization with each other during the disaster response process.

6. The energy supply system according to claim 4, wherein
the unmanned aircraft further includes an imager, communication circuitry that performs data communication with the management system, and a flight controller that controls a flight including takeoff and landing,
in response to reception, by the communication circuitry, of the flight route and a takeoff permission signal transmitted from the management system along with a start of the disaster response process, the flight controller starts the engine and causes the unmanned aircraft to take off from a departure base,
the flight controller causes the unmanned aircraft to fly to the specific consumer along the flight route after takeoff,
the flight controller performs landing control to cause the unmanned aircraft to land at the specific consumer when the airframe arrives above the specific consumer,
the landing control causes the imager to photograph a periphery of a predetermined scheduled landing site and transmit a peripheral image acquired by the photographing to the management system via the communication circuitry, and
upon receipt of a landing permission signal from the management system, the landing control causes the unmanned aircraft to land at the specific consumer and stops the engine.

7. The energy supply system according to claim 4, wherein
the unmanned aircraft further includes an imager, communication circuitry that performs data communication with the management system, and a flight controller that controls a flight including takeoff and landing,
in response to reception, by the communication circuitry, of the flight route transmitted from the management system along with a start of the disaster response process, the flight controller starts the engine and causes the unmanned aircraft to take off from a departure base,
the flight controller causes the unmanned aircraft to fly to the specific consumer along the flight route after takeoff,
the flight controller performs landing control to cause the unmanned aircraft to land at the specific consumer when the unmanned aircraft arrives above the specific consumer,
the landing control causes the imager to photograph a periphery of a predetermined scheduled landing site and transmit a peripheral image acquired by the photographing to the management system via the communication circuitry, and
the landing control determines whether there is any hindrance to landing on the scheduled landing site based on the peripheral image, and causes the unmanned aircraft to land at the specific consumer and stops the engine when there is no hindrance.

8. The energy supply system according to claim 7, wherein
when there is a hindrance to landing on the scheduled landing site in the landing control, the flight controller, based on the peripheral image, searches for a candidate landing site where a distance from the scheduled landing site is within a predetermined allowable range and there is no hindrance to landing,
when the candidate landing site is found, the flight controller causes the unmanned aircraft to land on the candidate landing site and stops the engine, and
when the candidate landing site is not found, the flight controller flies the unmanned aircraft in a direction of returning to the departure base, causes the airframe to land on the departure base, and stops the engine.

9. The energy supply system according to claim 1, further comprising a hydrogen production facility that is installed in the target region and electrolyzes water to produce hydrogen.

10. The energy supply system according to claim 1, wherein the mover is an unmanned aircraft including an airframe, an engine mounted on the airframe, a generator mounted on the airframe and configured to implement the power supply function.

11. The energy supply system according to claim 3, wherein
the management system performs a disaster response process of supplying power from the unmanned aircraft to a specific consumer designated as a disaster prevention base in the target region in a case where a power failure occurs in the power transmission and distribution system when a disaster occurs in the target region.

12. The energy supply system according to claim 3, wherein
the management system performs a disaster response process of supplying power from the unmanned aircraft to a specific consumer designated as a disaster prevention base in the target region in a case where a power failure occurs in the power transmission and distribution system when a disaster occurs in the target region, and
the disaster response process is a process of flying the unmanned aircraft along a predetermined flight route to the specific consumer.

13. The energy supply system according to claim 4, wherein
the unmanned aircraft further includes an imager, communication circuitry that performs data communication with the management system, and a flight controller that controls a flight including takeoff and landing.

14. The energy supply system according to claim 4, wherein
the unmanned aircraft further includes an imager, communication circuitry that performs data communication with the management system, and a flight controller that controls a flight including takeoff and landing, and
in response to reception, by the communication circuitry, of the flight route and a takeoff permission signal transmitted from the management system along with a start of the disaster response process, the flight controller starts the engine and causes the unmanned aircraft to take off from a departure base.

15. The energy supply system according to claim 4, wherein
the unmanned aircraft further includes an imager, communication circuitry that performs data communication with the management system, and a flight controller that controls a flight including takeoff and landing,
in response to reception, by the communication circuitry, of the flight route and a takeoff permission signal transmitted from the management system along with a start of the disaster response process, the flight controller starts the engine and causes the unmanned aircraft to take off from a departure base, and the flight controller causes the unmanned aircraft to fly to the specific consumer along the flight route after takeoff.

16. The energy supply system according to claim 4, wherein the unmanned aircraft further includes an imager, communication circuitry that performs data communication with the management system, and a flight controller that controls a flight including takeoff and landing, in response to reception, by the communication circuitry, of the flight route and a takeoff permission signal transmitted from the management system along with a start of the disaster response process, the flight controller starts the engine and causes the unmanned aircraft to take off from a departure base, the flight controller causes the unmanned aircraft to fly to the specific consumer along the flight route after takeoff, and the flight controller performs landing control to cause the unmanned aircraft to land at the specific consumer when the airframe arrives above the specific consumer.

* * * * *